(12) United States Patent
Watanabe

(10) Patent No.: US 7,421,549 B2
(45) Date of Patent: Sep. 2, 2008

(54) METHOD AND APPARATUS OF REMOTE COPY FOR MULTIPLE STORAGE SUBSYSTEMS

(75) Inventor: Naoki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/790,175

(22) Filed: Mar. 2, 2004

(65) Prior Publication Data
US 2005/0198452 A1    Sep. 8, 2005

(51) Int. Cl.
G06F 12/00 (2006.01)
G06F 13/00 (2006.01)
G06F 13/28 (2006.01)
G06F 17/30 (2006.01)

(52) U.S. Cl. .................. 711/162; 711/141; 711/161; 707/203; 707/204

(58) Field of Classification Search ................ 711/141, 711/161–162; 707/203–204; 714/6
See application file for complete search history.

(56) References Cited

U.S. PATENT DOCUMENTS

| 5,051,887 A * | 9/1991 | Berger et al. ................ 711/162 |
| 5,109,500 A | 4/1992 | Iseki et al. |
| 5,504,861 A | 4/1996 | Crockett et al. .............. 714/13 |
| 5,555,371 A * | 9/1996 | Duyanovich et al. .......... 714/13 |
| 5,689,729 A | 11/1997 | Inoue |
| 5,978,890 A | 11/1999 | Ozawa et al. |
| 6,065,018 A * | 5/2000 | Beier et al. ................. 707/202 |
| 6,236,528 B1 | 5/2001 | Katayama et al. |
| 6,240,494 B1 | 5/2001 | Nagasawa et al. |
| 6,301,643 B1 | 10/2001 | Crockett et al. ............. 711/162 |
| 6,321,236 B1 * | 11/2001 | Zollinger et al. ............ 707/203 |
| 6,321,292 B1 | 11/2001 | Ozawa et al. |
| 6,385,681 B1 | 5/2002 | Fujimoto et al. |
| 6,408,370 B2 | 6/2002 | Yamamoto et al. |
| 6,484,187 B1 | 11/2002 | Kern et al. |
| 6,539,381 B1 * | 3/2003 | Prasad et al. ................. 707/10 |
| 6,578,120 B1 * | 6/2003 | Crockett et al. ............. 711/162 |

(Continued)

OTHER PUBLICATIONS

Fibre Channel Physical and Signaling Interface (FC-PH), American National Standards Institute, Inc., Rev. 4.3, Jun. 1, 1994, pp. i-xxxiv, 1-32.

(Continued)

Primary Examiner—Sanjiv Shah
Assistant Examiner—Yaima Campos
(74) Attorney, Agent, or Firm—Reed Smith LLP; Stanley P. Fisher, Esq.; Juan Carlos A. Marquez, Esq.

(57) ABSTRACT

A system and method for synchronizing remote copies within a multiple storage network apparatus, incorporates the steps of receiving a plurality of timestamps, comparing the timestamps with a plurality of timestamps stored in a remote copy table, updating a synchronize time value stored by a synchronized time parameter, and receiving a synchronized time stamp, wherein the value associated with the received timestamp is ulterior to the value of the synchronized time stored by the synchronized time parameter. Further, a system and method for synchronizing secondary storage subsystems, incorporates the steps of collecting a plurality of synchronous timestamps from a plurality of secondary storage subsystems, comparing the plurality of collected synchronous timestamps with a synchronize time parameter, updating a remote copy time table, issuing a remote copy queue request, receiving status information about a secondary storage subsystem starting host, and synchronizing the secondary storage subsystem.

22 Claims, 16 Drawing Sheets

U.S. PATENT DOCUMENTS

| | | | |
|---|---|---|---|
| 6,694,335 B1 * | 2/2004 | Hopmann et al. | 707/201 |
| 6,813,683 B2 | 11/2004 | Tabuchi et al. | |
| 6,842,825 B2 | 1/2005 | Geiner et al. | |
| 6,938,045 B2 * | 8/2005 | Li et al. | 707/100 |
| 7,054,883 B2 | 5/2006 | Meiri et al. | |
| 2002/0038391 A1 | 3/2002 | Ido et al. | |
| 2002/0116405 A1 * | 8/2002 | Bodnar et al. | 707/202 |
| 2005/0132248 A1 | 6/2005 | Lecrone et al. | |
| 2005/0160248 A1 | 7/2005 | Yamagami | |

OTHER PUBLICATIONS

Fibre Channel Switch Fabric (FC-SW), American National Standard for Information Technology, , Rev. 3.0, Feb. 3, 1997, pp. iii-x, 1-64.

Blunden et al., "Implementing ESS Copy Services on S/390," International Business Machines Corp., Dec. 2000, http://www.redbooks.ibm.com, pp. iii-x, 145-173.

"S/390 Time Management and IBM 9037 Sysplex Timer," International Business Machines Corp., May 1999, http://www.redbooks.ibm.com, pp. iii-vii, 1-32, 55-70.

Patterson et al., "A Case for Redundant Arrays of Inexpensive Disks (RAID)," University of California, 1988, pp. 109-116.

Durham et al., The COPS (Common Open Policy Service) Protocol, Network Working Group, Standards Track, Jan. 2000, http://www.ietf.org/rfc2748.txt?number=2748, pp. 1-39.

"An Introduction to MPLS," http://www.convergedigest.com/Bandwidth/archive/010910TUTORIAL-rgallaher1.htm, 16 pages.

Multiprotocol Label Switching (MPLS) Traffic Engineering, Cisco IOS Release 12.0(5)S, pp. 1-11.

"Advanced Topics in MPLS-TE Deployment," Cisco Systems, Inc. 1992-2002, pp. 1-33.

Durham et al., The COPS (Common Open Policy Service) Protocol, Network Working Group, Standards Track, Jan. 2000, http://www.ietf.org/rfc2748.txt?number=2748, pp. 1-39.

"HP OpenView Network Node Manager," Hewlett-Packard Company, Version 6.4, Jan. 2003, 2001, pp. 1-64.

Clark, "IP SANs: A Guide to iSCSI, iFCP, and FCIP Protocols For Storage Area Networks," Nov. 2001, pp. 139-141, 170-172, 185-189.

"IBM TotalStorage Enterprise Storage Server Models F10 and F20," International Business Machines Corp., 2001, pp. 1-4.

"Hitachi Freedom Storage™, Software Solutions Guide," Hitachi Data Systems, pp. iv-x, 1-75.

SGI Storage Area Network (SAN), Datasheet, 2001, 2 pages.

A. C. Azagury et al., "Advanced Functions for Storage Subsystems: Supporting Continuous Availability", IBM Systems Journal, vol. 42, No. 2, 2003, pp. 268-279.

Mikkelsen, Claus, "The Hitachi NanoCopy™ Advantage—An Industry First for Point-in-Time and Real-Time Copy", Hitachi Data Systems Corporation, Jun. 1999, 17 pages. total.

* cited by examiner

| Consistency group | Primary Storage | Secondary Storage |
|---|---|---|
| C1 | #1<br>#2 | #3<br>#4<br>#5 |
| C2 | #10 | #11 |
| C3 | #11 | #10 |
| C4 | #6<br>#7 | #7<br>#8 |

FIG. 3

METHOD AND APPARATUS OF REMOTE COPY FOR MULTIPLE STORAGE SUBSYSTEMS

BACKGROUND OF THE INVENTION

1. Field of the Invention

This invention relates to storage systems, and in particular to storage area networks in which copying and remote copying of data provided by a host is provided.

2. Related Art

Modern storage systems provide users with the capability of continuously sending updates to a primary volume at a primary site and to a secondary volume at a secondary site, that is a mirrored volume of the primary volume, over a network in order to achieve a time-consistent copy of data. The remote copy operation is typically performed by host sending data and write requests to the primary storage system, which acknowledges the receipt of those write requests. Data that arrives at the primary storage system from the host is stored in a cache memory before being written to hard disk drives in the storage system. Either synchronously, by writing the data to hard disk drives, or asynchronously, the data is also written to storage media in a secondary storage system, typically located remotely from the primary storage system. In this manner, highly reliable access to the data is provided, making the system less susceptible to natural disasters or other events which may damage or destroy one of the two storage systems.

In storage networks with 1:1 configurations, satisfying a request for remote copies does not involve special challenges since the consistency of remote copies within the storage subsystems is easy to maintain. The challenges appear when the consistency of the remote copy is intended to be maintained in storage networks that span over multiple storage systems and have N:M configurations. In complex configurations the consistency of remote copies is increasingly difficult to manage. Synchronous remote copy provides a high degree of data currency and integrity, but can operate only at limited distances. In synchronous communications, the sender and receiver need to synchronize with one another before data is sent. This generally limits the communication between sender and receiver to short distances. Synchronous remote copy has a performance deficiency as I/O response times increase with the distance between the primary and secondary sites. This is due to what is known as "propagation delay," or the fact that, on average, the speed of light takes one nanosecond to travel one foot. This can add up when many miles are involved and synchronous copy techniques are effectively limited to distances of 25 miles or 40 kilometers (10 kilometers for Fibre Channel) depending on performance requirements. TrueCopy asynchronous extension for remote copy is not "real time" like synchronous remote copy, and can operate at any distance and has the data and transaction integrity necessary for disaster recovery. In open systems environments, timestamps from systems timer are used for data synchronization. Utilizing reliable timestamps, along with other information created by the primary system(s), allows systems to transmit updates directly to the secondary system (without any host intervention) and have the secondary system apply the same consistency group algorithms normally provided by a system data mover. This approach allows the enterprise to achieve data integrity in a significantly simpler and less costly hardware-based solution with no impact on server or application performance.

The challenges appear when a consistency group is intended to be set in a system including n primary storage subsystems and m secondary storage subsystems (N:M configurations). In complex configurations it is increasingly difficult to maintain IO consistency in the consistency group.

Nano-copy is a technology that currently provides solutions to the above mentioned problem. The nano-copy technology insures the consistency across multiple storage subsystems with N:M configuration. Nano-copy technology removes some of the drawbacks of synchronous remote copy (such as maximum distance and data integrity across multiple systems) without the processor-performance overhead usually associated with asynchronous remote copy implementations. Working with TrueCopy asynchronous software, nano-copy technology provides the a nondisruptive, I/O- and time-consistent, long-distance remote copy that can be used safely for disaster recovery and PiT copy. The nano-copy software allows "any-to-any" remote copy, the software providing remote copy with integrity for any number of primary storage systems connected to a single sysplex timer, to any number of remote image systems, anywhere in the world, at any time. Nano-copy technology comes closest to the perfect solution by allowing customers to create a truly nondisruptive PiT copy. A storage-based copy solution creates an image of any amount of data without incurring an application or system outage. Furthermore, the copy can be made to any place on the globe. For disaster protection, nano-copy technology is a product that solves the extraordinarily complex problem of ensuring that critical data can survive a rolling disaster. With outstanding data integrity, nano-copy technology maintains a copy of critical data at any distance, and also does so by using a simple and low-cost technique that has minimal impact on critical applications. Nano-copy technology has the potential for providing solutions to the enterprise. It offers a simple and low-cost alternative to existing remote copy technologies without compromising data integrity. It also provides a capability of taking point-in-time copies without disruption to applications.

What are needed are apparatus and methods of use that allow consistency to be maintained within storage systems with complex configurations without management from a host. One of the main advantages, provided by a capability to maintain consistency within the storage subsystems without the need of external management from a host, is that it provides platform/application independent infrastructure.

BRIEF DESCRIPTION OF THE INVENTION

The present disclosure describes a system and a method to maintain I/O consistency in a consistency group among multiple storage subsystems with complex N:M configurations.

In one embodiment, the primary storage subsystems broadcast synchronization requests. The synchronization requests are sent with a timestamp that is provided by a host computer. Sequential numbers are also included.

The remote copy queue is also synchronized using the time stamp contained in the synchronization request. The secondary storage subsystems synchronize per the predefined period transit status of the IO request in the remote copy requests that are older than the synchronize time. They are recorded on a disk by sequence numbers or timestamps.

In case of a network failure, either provoked or unpredicted, the remote copy pairs are suspended and a remote copy manager (RCM) synchronizes the secondary storage subsystems. The RCM manager manages to recuperate the failure time and the secondary storage subsystems record a bitmap with synchronized time.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The present invention will be described with reference to the accompanying drawings. The drawing in which an element first appears is typically indicated by the leftmost digit (s) in the corresponding reference number.

FIG. 3 illustrates an embodiment of a consistency group table.

DETAILED DESCRIPTION OF THE INVENTION

Figure 1:
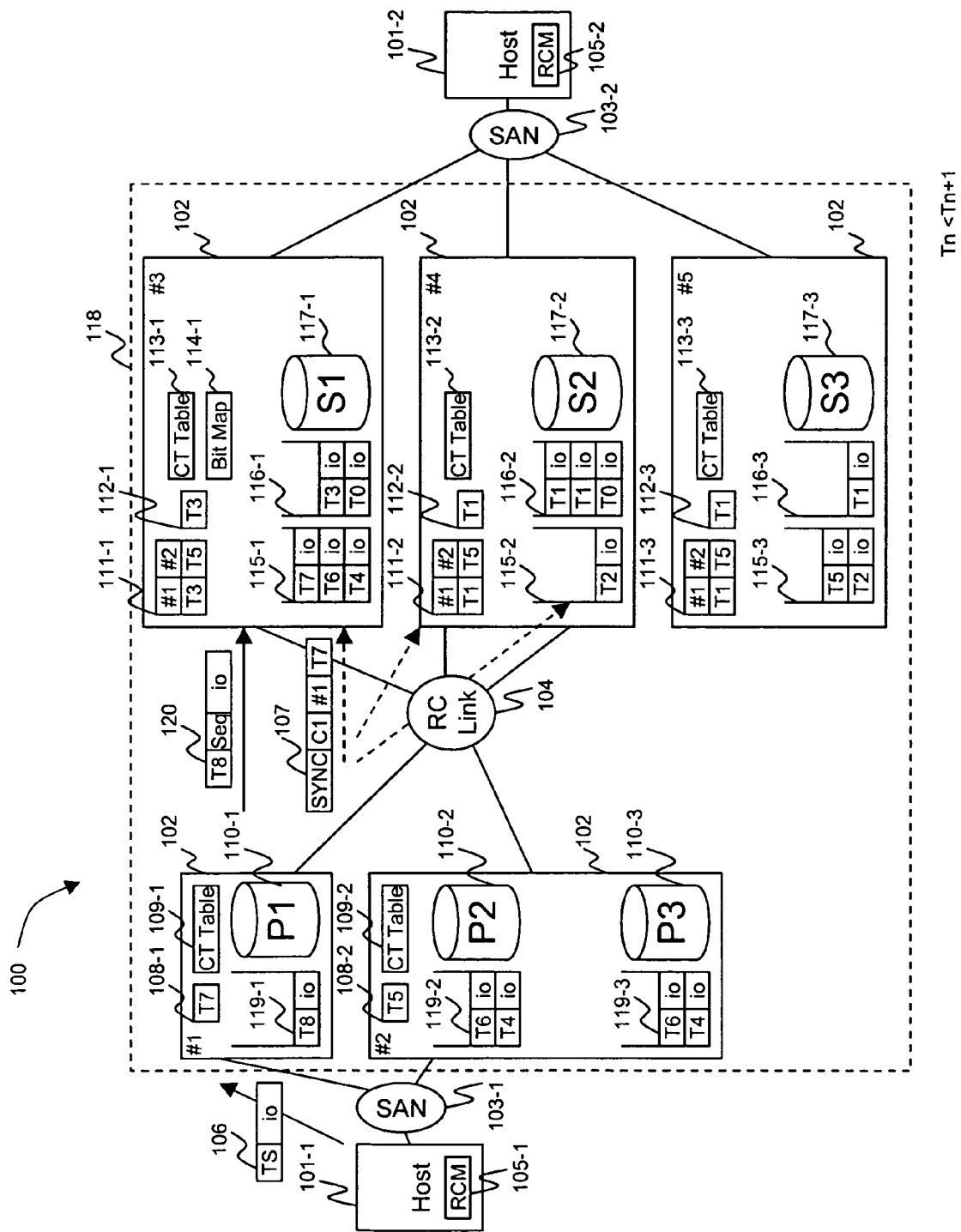
FIG. 1 illustrates an embodiment of system configuration for multiple storage subsystems, according to the present invention.

FIG. 1 illustrates a system configuration of a multiple storage subsystems apparatus, according to the present invention.

Data processing system 100 includes a plurality of host computers 101, a plurality of storage area networks (SANs) 103, a plurality of primary storage subsystems 102 #1, 102 #2 and a plurality of secondary storage subsystems 102 #3, 102 #4, 102 #5. The number of host computers 101 and primary and secondary storage subsystems 102 is not relevant for the basic principle that governs the working principle of the system.

Each of the host computers 101 includes an I/O interface for connecting a SAN 103 and a remote copy manager (RCM) 105 comprised by the host computer 101. The RCM 105 is a management software that manages each remote copy pair and a consistency group 118.

The SAN network 103 uses any appropriate protocol, such as fiber channel protocol (FCP), Fibre Connection (FICON), Small Computer System Interface (SCSI), and Enterprise Systems Connection (ESCON). The storage subsystems 102 are connected to each other via a remote copy link 104.

The remote copy link 104 uses any appropriate protocol, such as FCP, FICON, SCSI, ESCON. For long distance connections, the remote copy link 104 can use wide area networks (WAN) such as: internet protocol (IP), ATM, SONET, Dark Fiber. In these cases, the remote copy link 104 needs extenders that provide protocol translation into WAN protocol.

Each of the primary storage subsystems 102 comprises at least one of primary volume 110, time parameter 108, a consistency group table 109, and a queue 119. Each of the secondary storage subsystems 102 includes at least one of secondary volume 117, a time parameter 111 #1, a time parameter 111 #2, a time parameter 112, a consistency group table 113, a bit map 114, a remote copy queue 115, and a disk request queue 116. Secondary volume S1 117-1 is a mirrored volume of primary volume P1 110-1 and is paired with volume P1. Secondary volume S2 117-2 is a mirrored volume of primary volume P2 110-2 and is paired with volume P2. Secondary volume S3 117-3 is a mirrored volume of primary volume P3 110-3 and is paired with volume P3. This configuration is only an example, and the pairs can be configured differently using all possible combinations. In this example, a consistency group 118 is set among primary storage subsystems #1, #2 and secondary storage subsystems #3 through #5. Within this consistency group 118 the I/O consistency is maintained. For maintaining the simplicity and for exemplary purposes only, FIG. 1 illustrates only one consistency group but a plurality of consistency groups can be set. Consistency group tables 109 and 113 store configuration information for the consistency group(s). A bitmap 114 is created for each volume pair to manage the differences between the primary volume and the secondary volume after pair suspension. Each bit is assigned to any size of data such as a block (512 byte), a track, a cylinder, etc. For example, if a bit is set in the bitmap 114-1 for the volume pair consisting of primary volume P1 110-1 and secondary volume S1 117-1, S1 does not contain exactly the same data as P1 at the corresponding block, track or cylinder. The bit map is used for re-synchronization between the primary volume P1 and the secondary volume S1. Primary storage subsystem may have the same type of bitmap.

The host computer 101 issues I/O requests 106 to primary volumes. Each I/O request 106 includes at least a timestamp (TS) and an I/O command. Also, data can be included in the I/O request. In this embodiment, the timestamp is provided by the host computer 101-1. For example, the timestamp is time provided by a system timer of a host computer, such as the IBM Sysplex Timer. In FIG. 1, an I/O request 106 to primary volume P1 110-1 is sent to the primary storage subsystem 102 #1. When receiving the I/O request, the primary storage 102 #1 conducts the necessary I/O processing to its cache memory or the primary volume P1 110-1.

If an I/O request 106 is an update request, the corresponding primary storage subsystem 102 issues a remote copy request 120 addressed to the corresponding secondary storage subsystem. The remote copy request 120 includes a timestamp (for example, T8 in FIG. 1) included in the I/O request 106, an I/O command to reflect the update to the primary volume to the corresponding secondary volume and update data. It may also include a sequence number (for example Seq in FIG. 1) provided by the primary storage subsystem that issues the remote copy request. The sequence number, which may be used in asynchronous remote copy, is provided by each primary storage subsystem. The secondary storage subsystem checks the sequence number embedded in the remote copy request to ensure that no request is missing over the remote copy link. If a missing request is detected, the corresponding request is re-sent from the primary storage subsystem. The remote copy request 120 is entered into a queue 119. In the embodiment illustrated here for exemplary purposes, the timestamp TS and the sequence number Seq are queued in the queue 119 and the update data is stored in its cache memory. The remote copy request is also sent to the corresponding secondary storage subsystem either in a synchronous or asynchronous manner. In FIG. 1, a remote copy request 120 is sent to the secondary storage subsystem 102 #3 so that the update to the primary volume P1 is reflected to the secondary volume S1. The request 120 is usually an update request and includes, but is not limited to, a "WRITE" command. When receiving the remote copy request, the corresponding secondary storage subsystem sends a completion confirmation of the remote copy request to the corresponding primary storage subsystem. Only after receiving the completion message, the corresponding primary storage subsystem removes the remote copy request from the queue 119. The corresponding primary storage subsystem also compares the time indicated by time parameter 108 with the timestamp included in the removed remote copy request. If the time parameter 108 indicates earlier time than the timestamp, the time parameter 108 is updated to the timestamp. In FIG. 1, the time parameters 108-1 and 108-2 are set at T7 and T5, respectively. This means the secondary storage subsystem 102 #3 received a remote copy request 120 with a timestamp equal to or less than T7, and the secondary storage subsystem 102 #4 or #5 received a remote copy request 120 with timestamp equal to or less than T5.

When receiving the remote copy request 120, the secondary storage 102 #3 enters it into a remote copy queue 115. Because the remote copy requests may arrive out of sequence, the secondary storage 102 #3 sorts the queued remote copy requests using the timestamp. In this embodiment, the timestamp and the sequence number is queued in the remote copy queue 115-1. The secondary storage subsystem manages the timing for moving the remote copy request 120 from the remote copy queue 115 to the disk request queue 116 based on the time parameter 112. The timing of the movement will be described later. The remote copy request entered in the disk request queue 119, or IO processing to the corresponding secondary volume, is asynchronously executed. After completion of the execution, the remote copy request is removed from the queue 119.

The primary storage subsystem 102 has one or more remote copy times 108 for each consistency group. The remote copy times indicate the latest time of the subsystem in consistency group 118. The consistency group 118 comprises one or more primary storage subsystems 102 and one or more secondary storage subsystems 102. The consistency group 118 can span over multiple storage subsystems 102. The storage subsystems of consistency group 118 must keep the consistency of remote copy times among storage subsystems 102.

Each logical volume 102 (P1, P2, and P3 in the exemplary embodiment of the invention illustrated by FIG. 1) has a consistency group table 109. This table log includes configuration information for the consistency group.

Each logical volume periodically issues a synchronize request 107 addressed to either all secondary logical volumes in the same consistency group or all secondary storage subsystems in the same consistency group. In the latter case, the amount of transmit request may decrease. FIG. 1 depicts a synchronize request 107 sent from storage subsystem 102 #1 to secondary storage subsystems 102 # 3-5 within the same consistency group 118 having a consistency group ID C1. A synchronize request 107 includes a consistency group ID (for example C1, in FIG. 1), a primary storage subsystem ID (for example #1, in FIG. 1), and a timestamp (for example T7, in FIG. 1). The consistency group ID is an ID of the consistency group that includes the primary storage subsystem sending the synchronize request and the secondary storage subsystem receiving the request. The primary storage subsystem ID indicates an ID of the primary storage subsystem sending the synchronize request. The timestamp is the time indicated by the time parameter 108 of the primary storage subsystem sending the synchronize request. When receiving a synchronize request from the primary storage subsystem 102 #1, each of the secondary storage subsystems retrieves the timestamp from the request and compares the retrieved timestamp with time indicated by the time parameter 111 #1. If the timestamp 111 #1 indicates an earlier time than the retrieved timestamp, the time parameter 111 #1 is updated to the retrieved timestamp value. In FIG. 1, the secondary storage subsystem 102 #3 is receiving the sync request 107 with timestamp T7. When receiving the request 107, the secondary storage subsystem 102 #3 updates the time parameter 111 #1 from T3 to T7. In the same way, when receiving a synchronize request from the primary storage subsystem 102 #2, each of the secondary storage subsystems updates the time parameter 111 #2, if updating is needed.

Each secondary storage subsystem 102 compares time parameter 111 #1 with time parameter 111 #2. The time parameter 112 is set with the lesser time value. In FIG. 1, the time parameter 111-1 #1 indicates T3 and the time parameter 111-1 #2 indicates T5 such that the time parameter 112-1 is set at T3.

Remote Copy Manager (RCM) 105 pertaining to the plurality of host computers 101 is management software that manages each remote copy pair and the consistency group 108. RCM 105 is software which can be deployed on any component in the exemplary environment. In the embodiment of the invention illustrated by FIG. 1, RCM 105 can connect to all (S1, S2, and S3) secondary storage subsystems when a remote copy request 120 is issued by a primary storage subsystem 102 for the secondary storage subsystem 102.

At the level of secondary storage subsystems 102, time parameter 112 and the consistency group table 113 also have to be synchronized. The information is basically the same information as for the primary storage subsystem 102.

Four kinds of information are added to the information stored by the secondary storage subsystems 102. Synchronize time table 111 includes all the synchronized time that is sent from the primary storage subsystem as synchronize request 107.

A remote copy queue 115 is used for remote copy request 120. All remote copy requests are inserted into the remote copy queue 115, pertaining to the secondary storage 102. Further, the secondary storage subsystem manages the state transition of remote copy request 120 from remote copy queue 115 to the disk request queue 116. The timing of the state transition is managed based on synchronize time table 111. The remote copy request is asynchronously executed in the disk request queue 119.

The secondary storage subsystems 102 comprise a bitmap 114. The primary storage subsystems 102 have bitmap 114 for storing differentiate data. This capability corresponds to the same capability as conventional remote copy. Each bit is assigned to any size of data such as a block (512 byte), a track, a cylinder, etc.

Figure 2:
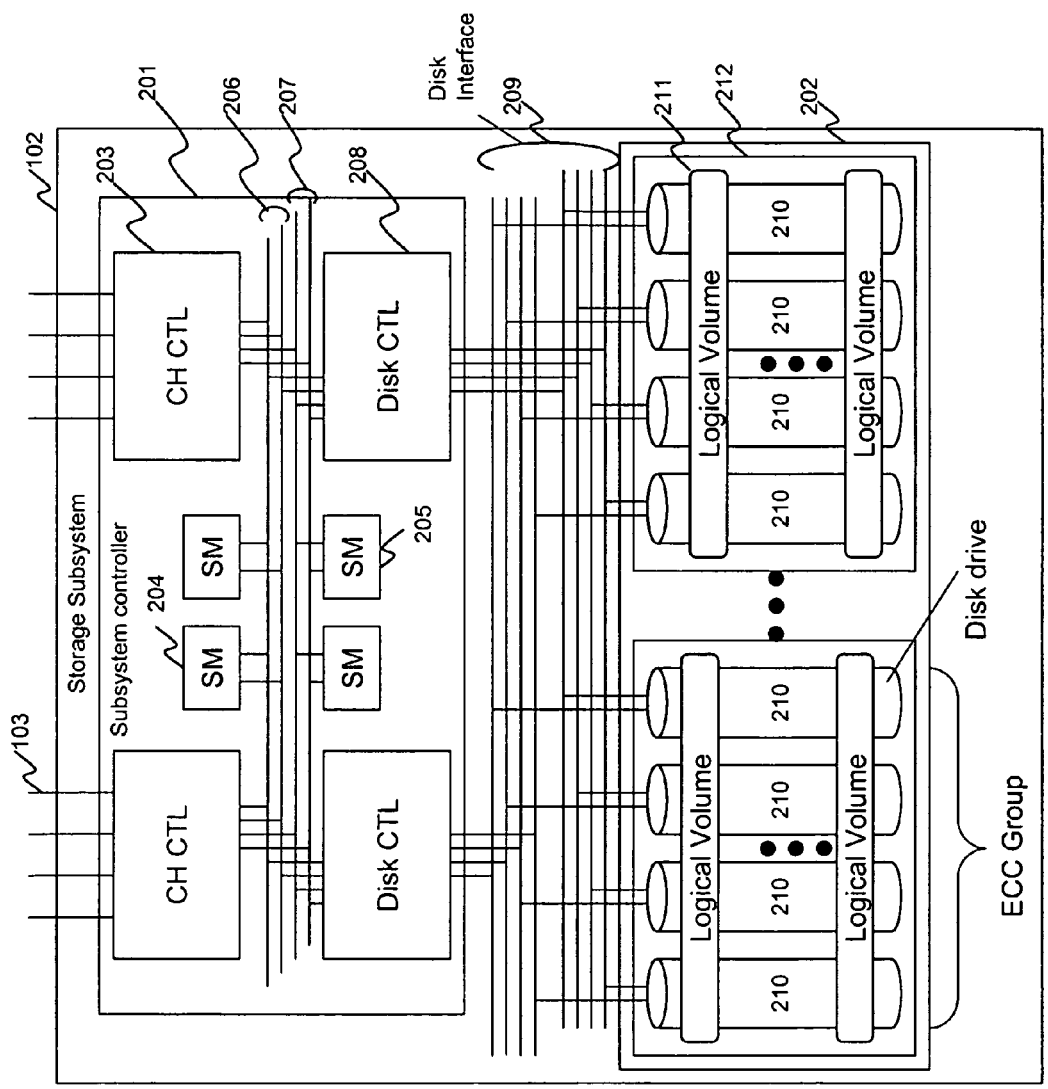
FIG. 2 illustrates an embodiment of a storage subsystem.

FIG. 2 illustrates the configuration of a storage systems environment.

Storage system 102 comprises SAN interface 103, subsystem controller 201, disk enclosure 202, channel controllers (CH CTL) 203, shared memory (SM) 204, cache memory (CM) 205, disk controllers (Disk CTL) 208, internal connections 206 and 207, disk controllers (Disk CTL) 208, disk interface 209, disk drives 210, logical volume 211, and Ecc group 212.

Host 101 and storage subsystem 102 are connected by means of IO interface SAN 103. SAN 103 can be fiber channel, ESCON, etc. The number of hosts 101 and storage subsystems 102 is not relevant for the basic principle that governs the working principle of the system.

Storage subsystem 102 mainly includes a subsystem controller 201 and a disk enclosure 202. The subsystem controller 201 includes channel controllers (CH CTL) 203, disk controllers (Disk CTL) 208, shared memory (SM) 204 and cache memory (CM) 205. These components are configured as a pair (duplicated). Each component is energized from a different power boundary (source). The components are connected by internal connections 206 and 207. The internal connections 207 are used to access the SM 204. SMs 204 are used for storing the control data for the storage subsystem 102. The internal connections 207 are used to access the CM 205. CMs 205 are used for storing data received from host 101. Both SMs 204 and CMs 205 have battery backups and are dual powered. CH CTL 203 receives the I/O request from host 101, then analyzes it and issues a job for disk CTL 208. The internal job is stored by the SM 204. Disk CTL 208 issues an I/O request for disk drives 210. Disk CTL 208 receives the job from SM 204, and analizes it and issues an I/O request for the disk drives 210.

Disk enclosure 202 comprises physical disk drives 210. Disk drives 210 are connected to Disk CTLs 208 via disk interface 209. Disk drives 210 are physical layouts. However, host 101 can only have a logical view and perceives a logical volume 211. Within ECC group 212, some of disk drives are configured as RAID architecture, such as RAID 5. The ECC group 212 is divided into logical volumes 211. Storage subsystem 102 provides a replication method between logical volumes 211. The replication method can be via local replication or remote replication. Local replication is a logical volume replication within the storage subsystem 102. Remote replication is a logical volume replication across storage subsystems 102.

Figure 3:
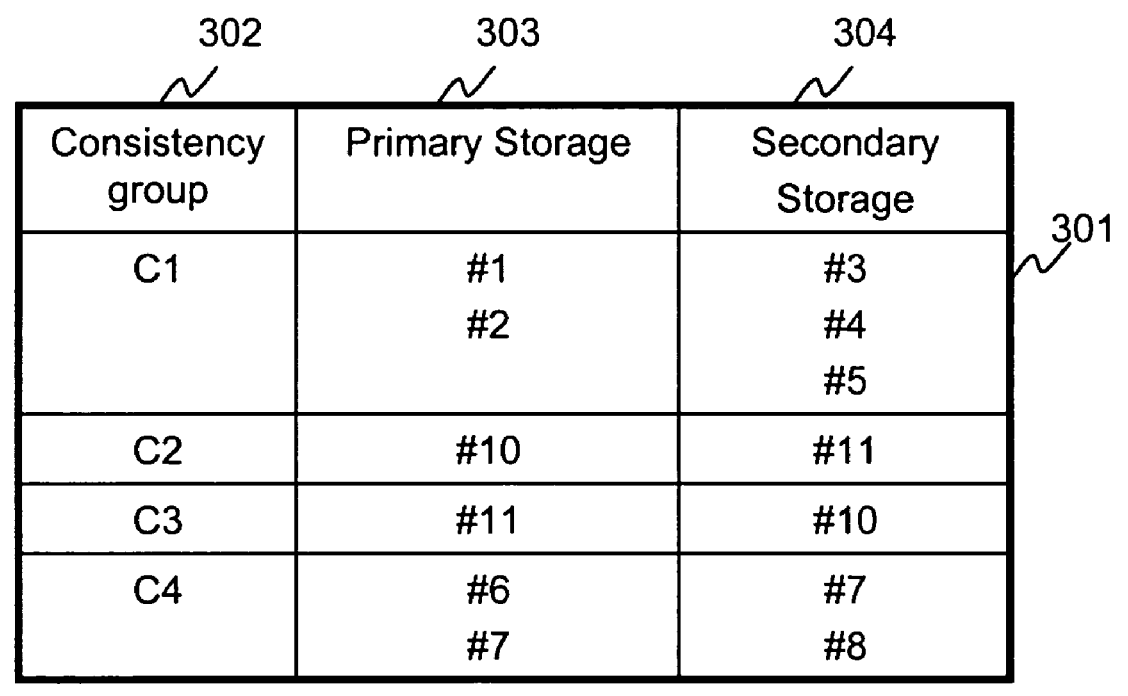

FIG. 3 illustrates an example of a consistency group table.

Table 301 comprises information about consistency group 302, and corresponding primary storage subsystem 303 and secondary storage subsystem 304.

For example, consistency group C1 118 is set among primary storage subsystems 102 #1, #2 and secondary storage subsystems 102 #3-#5.

Table 301 is used for facilitating the primary storage to issue the synchronize request 107 and for facilitating the secondary storage to update the time parameter 112.

In the case of consistency group C4, its primary storage subsystems are #6 and #7 and its secondary storage subsystems are #7 and #8. In this case the primary storage subsystem 303 and secondary storage subsystem 304 are the same, #7.

The above described apparatus is used for configuring the consistency group. The apparatus and the method of use that constitute the object of the present invention are applicable to both the synchronous and asynchronous remote copies.

In order to obtain synchronous remote copies, an I/O request 106 and data from host 101 are received. The host 101 issues an I/O request 106 that bears a timestamp. Data is stored into the cache memory 205. A remote copy request 120 and data are issued for the secondary storage subsystem 102, which is configured as secondary storage volume 117 of primary storage volume 110. The status of the remote copy request is received and returned to the host computer.

In order to obtain asynchronous remote copies, an I/O request 106 and data from host computer 101 are received. The host computer 101 issues an I/O request 106 that bears a timestamp. Data is stored into the cache memory 205. The I/O request is registered as an asynchronous remote copy request. A status report is returned to the host computer 101.

Asynchronous remote copies can be obtained working directly with the secondary storage subsystems. A remote copy request is issued to the secondary storage subsystem 102 which is configured as secondary volume 117 of primary volume 110. The remote copy request 120 can consist of one or more I/O requests. The status of the remote copy request 120 is received. The I/O request is marked as "done". At the level of the secondary storage subsystem, the procedure consists of receiving the remote copy request 120 and the data, inserting the remote copy request 120 into the remote copy queue 115, and storing the data into the cache memory 205. A status report is returned to the primary storage subsystem 102. The I/O request 106 will be stored to disk 210 asynchronously.

In the case of asynchronous remote copy, the apparatus might issue a status report of "out of order". In order to maintain the consistency of the remote copy, the primary storage subsystem 102 adds a sequence number to the remote copy request. The secondary storage subsystem 102 uses the sequence number to sort the remote copy requests 120. One other possibility to sort the remote copy requests is to use the timestamp as a sequence number.

The following is the synchronizing procedure for the primary storage subsystem. Its denomination can also be broadcast synchronize request.

The primary storage subsystem 102 issues a synchronize request 107 to all secondary storage subsystems 102 in the consistency group 119. The timestamp in the synchronize request 107 is the latest consistent time for the primary storage subsystem 102. The I/O request can have up to three I/O requests #1 ($T_1$), #2 ($T_2$), #3 ($T_3$) in the remote copy pair, wherein $T_1<T_2<T_3$. The I/O request #1 106 and #2 106 are complete, with good status. But I/O request #3 106 is not complete and has been labeled with "not good status". If in this case, $T_1$ is the latest consistent time, then the synchronize request 107 should include $T_1$ as the synchronize time. If there are no updates posted in the meantime, the primary storage subsystem 102 issues the same timestamp as before.

Figure 4:
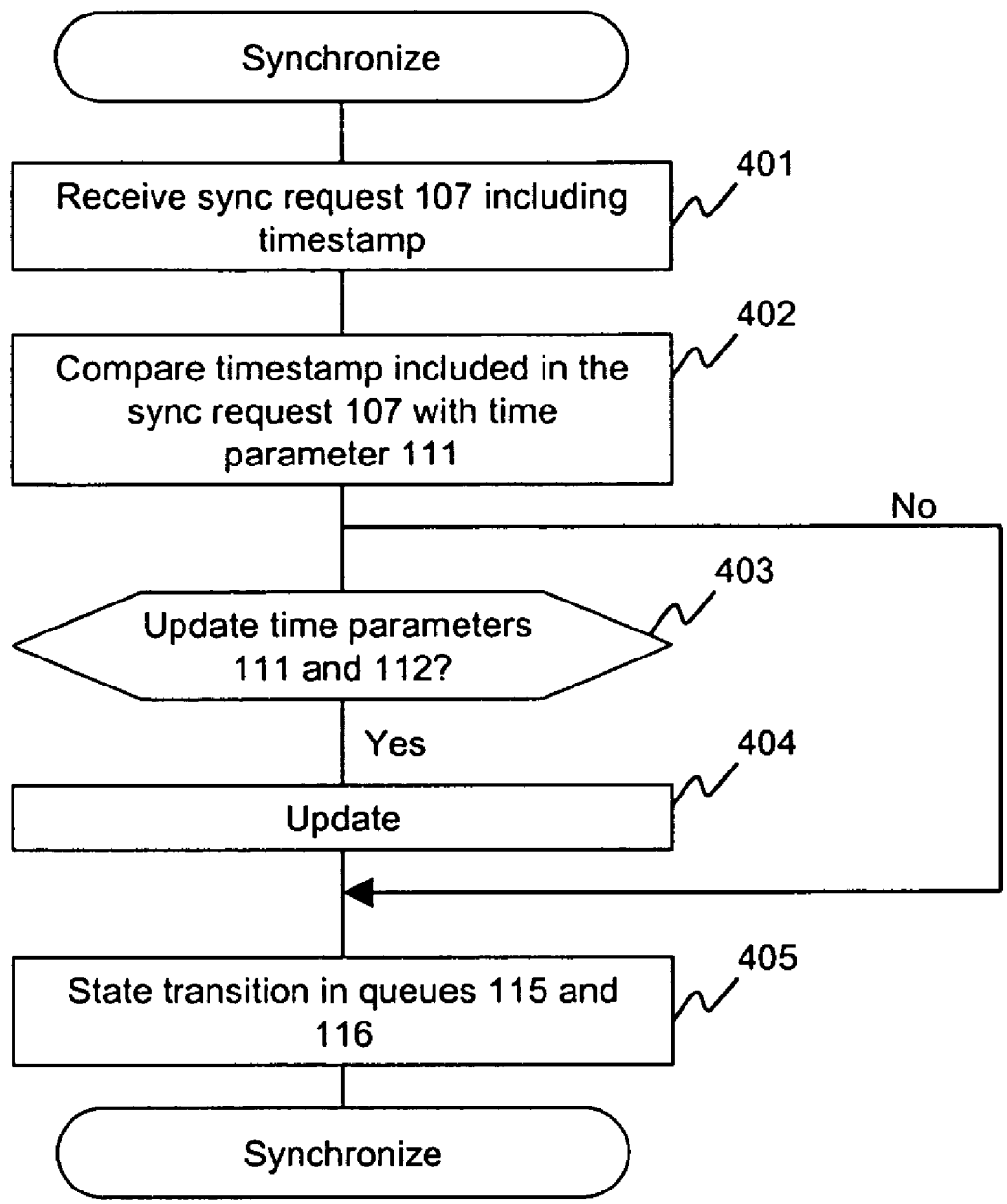
FIG. 4 illustrates a flow diagram of synchronization procedure between the primary storage subsystems and the secondary storage subsystems.
Figure 5A:
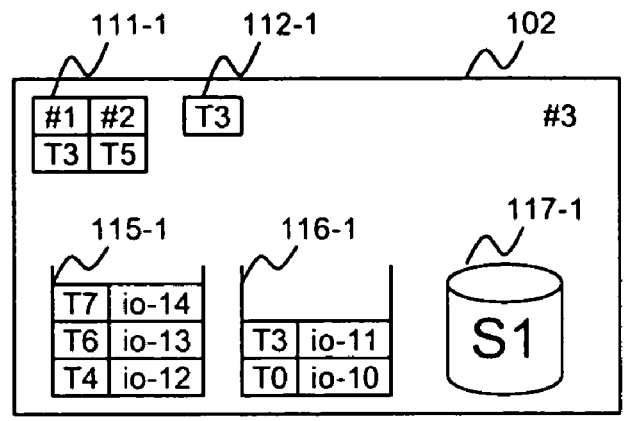
FIG. 5 illustrates the state transition of the secondary storage subsystems in the synchronization procedure described in FIG. 4.
Figure 5B:
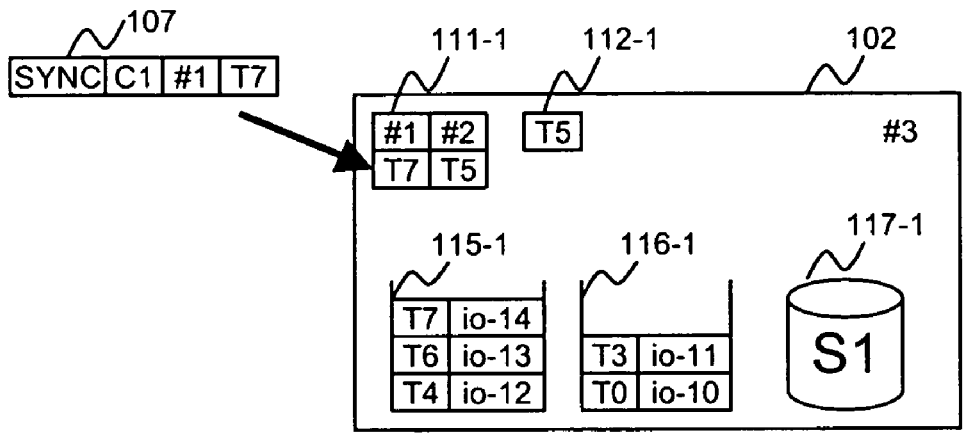
Figure 5C:
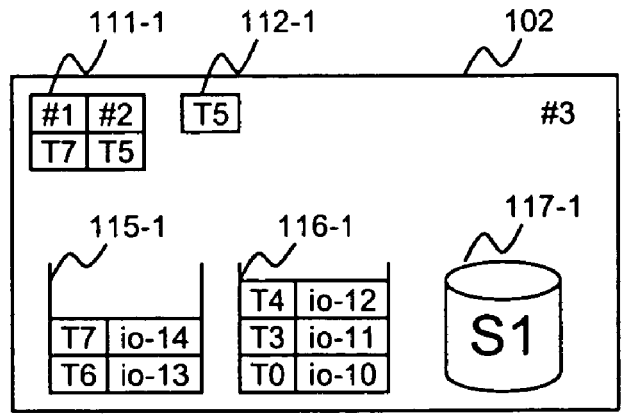

Referring to FIGS. 4 and 5, a procedure when the secondary storage subsystem 102 #3 receives a synchronize request 107 will be described in detail. FIG. 4 illustrates a flow diagram of the synchronization procedure and FIGS. 5A-C illustrate the state transition at the secondary storage subsystem. The other secondary storage subsystems perform similar procedures when receiving a synchronize request 107.

Synchronizing method 400 comprises the steps of receiving timestamp 401, comparing times 402, checking if updated 403, assessing and updating transit status 404 and synchronizing.

The apparatus that employs the object of the present invention and its method of use do not intend to maintain consistency at the level of secondary storage subsystem 102 exactly, but to roughly manage the consistency (queue overlap) among secondary storage subsystems 102. Thus, after the suspension of consistency group 118, the secondary storage subsystems 102 must be synchronized.

All secondary storage subsystems 102 must execute the remote copy procedure and the synchronize procedure. This procedure is illustrated by FIG. 5 and summarized below as follows:

The initial state of the secondary storage subsystem 102 is illustrated by FIG. 5A.

FIG. 5A illustrates a state of the secondary storage subsystem 102 #3 at a certain time. The time parameter 111-1 #1 indicates T3 and the time parameter 111-1 #2 indicates T5. As mentioned, the time parameter 111-1 #1 indicates a timestamp included in a synchronize request 107 received from the primary storage subsystem 102 #1, and the time parameter 111-1 #2 indicates a timestamp included in a synchronize request 107 received from the primary storage subsystem 102 #2. As T5>T3, the time parameter 112-1 is set at T3. Only I/Os with timestamp less than or equal to the time indicated by parameter 112-1 are moved from the remote copy queue 115-1 to the disk request queue 116-1.

The secondary storage subsystem 102 #3 receives synchronize requests 107 from the primary storage subsystems 102 #1 and #2 periodically (corresponding to step 401 in FIG. 4). In FIG. 5B, the secondary storage subsystem 102 #3 receives a synchronize request 107 from the primary storage subsystem 102 #1. The secondary storage subsystem 102 #3 retrieves the timestamp (T7 in FIG. 5B) from the synchronize request 107. The secondary storage subsystem 102 #3 compares the retrieved timestamp with the timestamp indicated by the time parameter 111-1 #1 if the synchronize request comes from the primary storage subsystem 102 #1, and compares the retrieved timestamp with the timestamp indicated by the time parameter 111-1 #2 if the synchronize request comes from the primary storage subsystem 102 #2 (step 402 in FIG. 4). If the retrieved timestamp is greater than the corresponding time parameter 111-1, an update occurs. Otherwise, the update does not occur (steps 403 and 404 in FIG. 4). The update that occurs is described in FIG. 5B. As T7 included in the synchronize request 107 is greater than T3 indicated by the time parameter 111-1 #1, the time parameter 111-1 #1 is updated to T7. This update makes the time parameter 111-1 #1 greater than the time parameter 111-1 #2, so that time parameter 112-1 is updated to T5. When the time parameter 112-1 is updated, since the timestamp (T7) associated with io-12 is greater than the timestamp (T5) that time parameter 112-1 indicates, io-12 is moved to the disk request queue 116-1.

If all time parameters 112-1, 112-2 and 112-3 indicate the same time, consistency is perfectly maintained among the secondary storage subsystems 102 #3-#5. However, the time parameters may not indicate the same time due to several reasons (for example, transmission delay in the RC link 104). In this case, consistency is not perfectly maintained among the secondary storage subsystems 102. Thus, when a consistency group is suspended, the secondary storage subsystems are synchronized in a manner as described in connection with FIGS. 6 and 7.

Before the description of the synchronized manner, a description of suspension is given. The consistency group 118 can be suspended in a planned or unplanned way for several reasons.

In one example of a planned suspension, the storage administrator can split consistency group 118 by issuing a "split command" addressed to RCM 105. RCM 105 issues split commands for all storage subsystems 102 that are in the same consistency group 118. Consequently, all remote copy pairs are suspended.

An unplanned suspension occurs due to failure such as a remote copy queue puncture and a remote copy pair failure.

A remote copy queue puncture occurs when one or more primary volumes 110 are overloaded. The number of I/O requests 106 in the remote copy queue 119 at a primary storage subsystem 102 increases over its capacity. In this case, it takes time to have the time parameter 108 updated; therefore, it takes time to have the time parameter 112 in each of the secondary storage subsystems in the same consistency group updated. This causes an increase in the number of remote copy requests 120 in the remote copy queue 115. Finally, one or more of the remote copy queues 115 will be punctured. The puncture causes remote copy pair suspension. As a result, the consistency group 118 is suspended in order to maintain its consistency.

A pair failure occurs if one of the remote copy pairs in the consistency group 118 fails due to, for example, remote link failure and hardware failure. RCM 105 monitors the remote copy pair status in the consistency group 118. When RCM 105 detects the pair failure, the RCM or the administrator manually issues a split command to the all storage subsystems in the consistency group 118.

Pair failures can be detected in the following way. The primary subsystems 102 periodically issues synchronize requests 107. The secondary storage subsystem 102 returns an acknowledgement (ACK) that the request command has been received. The primary storage subsystems 102 can detect the failure of the pair by the ACK timeout. The secondary storage subsystems 102 also can detect the failure of the pair by not receiving synchronize request 107 within a predetermined time.

If the consistency group 118 is suspended due to any of the reasons described above, the secondary storage subsystems may need to be synchronized.

Figure 6A:
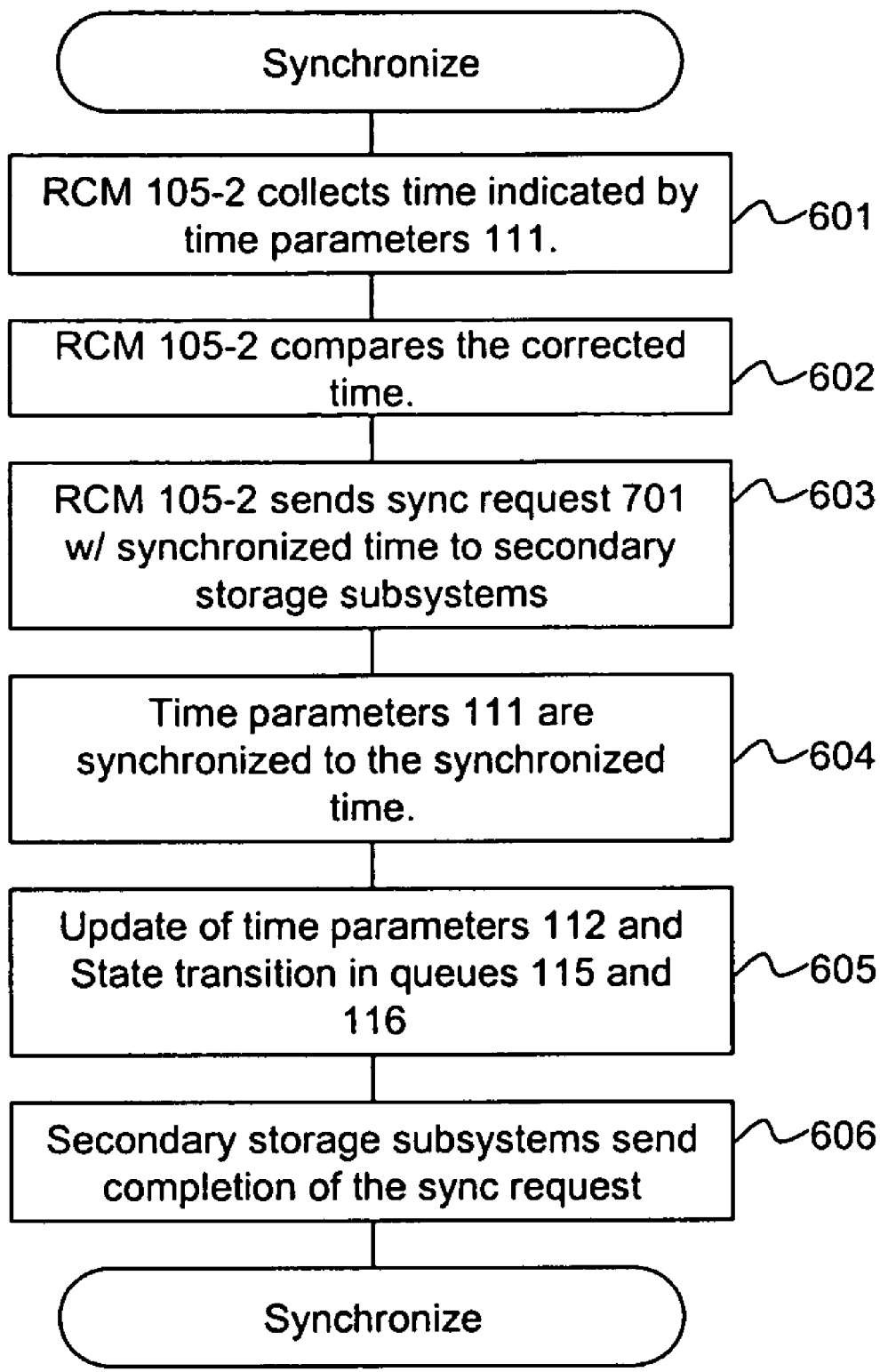
FIG. 6 illustrates a flow diagram of synchronization procedure between the secondary storage subsystems after remote copy pair suspension occurs.
Figure 6B:
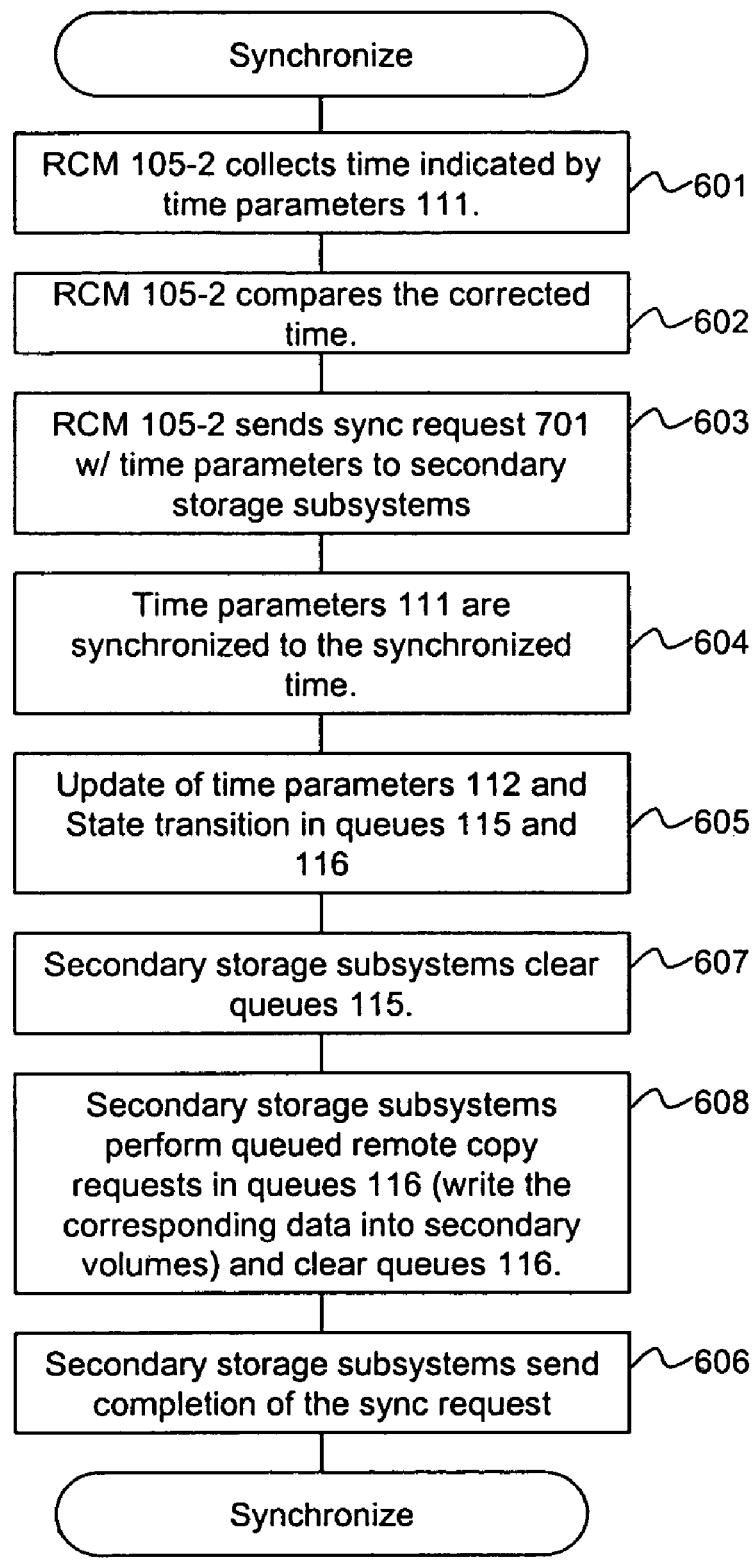

In FIGS. 6A, 6B and 7A to 7G, a procedure for synchronizing secondary storage subsystems after consistency group suspension occurs is described. FIGS. 6A and 6B illustrate flow diagrams of the procedure, and FIGS. 7A to 7G illustrate the state transitions in secondary storage subsystems during the synchronizing procedure.

Figure 7A:
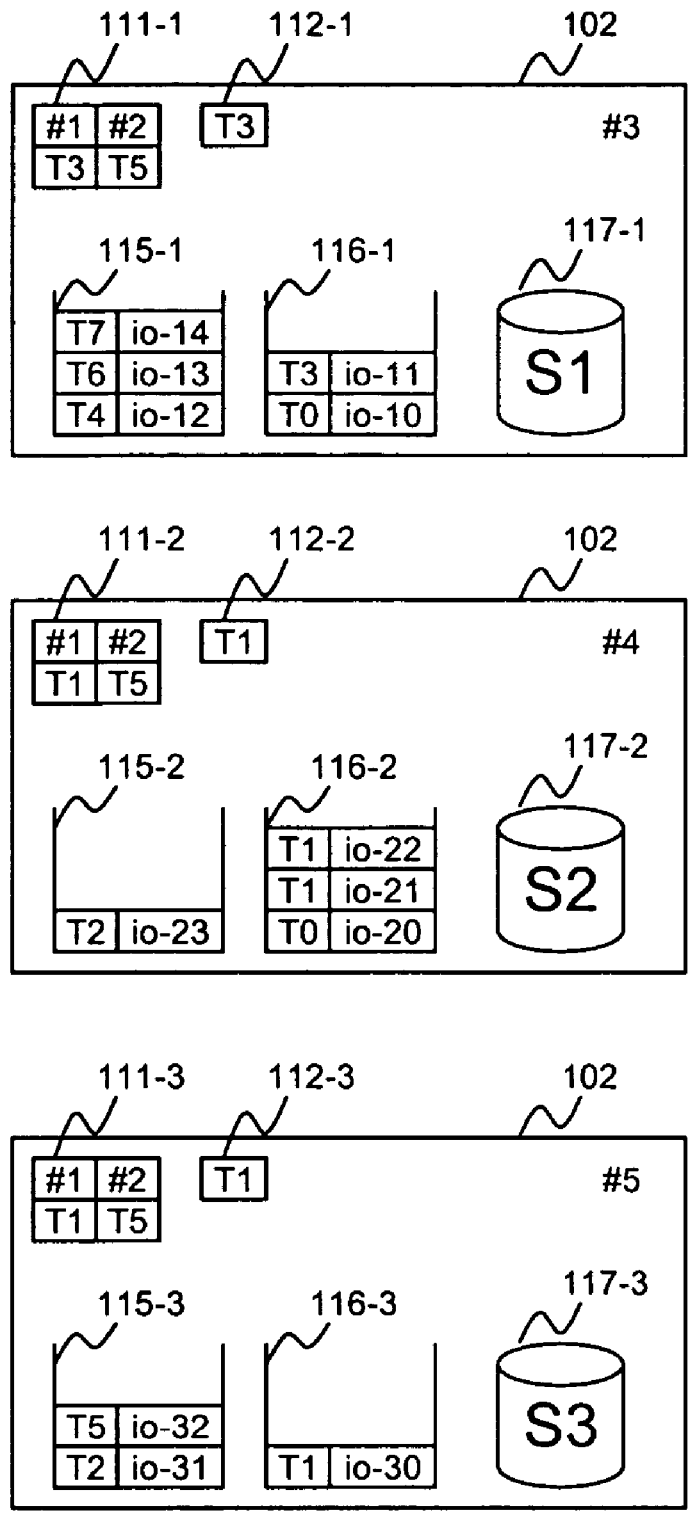
FIG. 7 illustrates state transition of the secondary storage subsystems in the synchronization procedure described in FIG. 6.

It is assumed that the consistency group 108 is suspended in a given condition illustrated in FIG. 7A. io-11 (T3) has already been moved to the disk request queue 116-1, but io-23 (T2) and io-31 (T2) are still in the remote copy request queues 115-2 and 115-3, respectively. To achieve consistency among the secondary storage subsystems 102 #3-5, io-23 (T2) and io-31 (T2) need to be moved to the disk request queues 116-2 and 116-3, respectively.

Figure 7B:
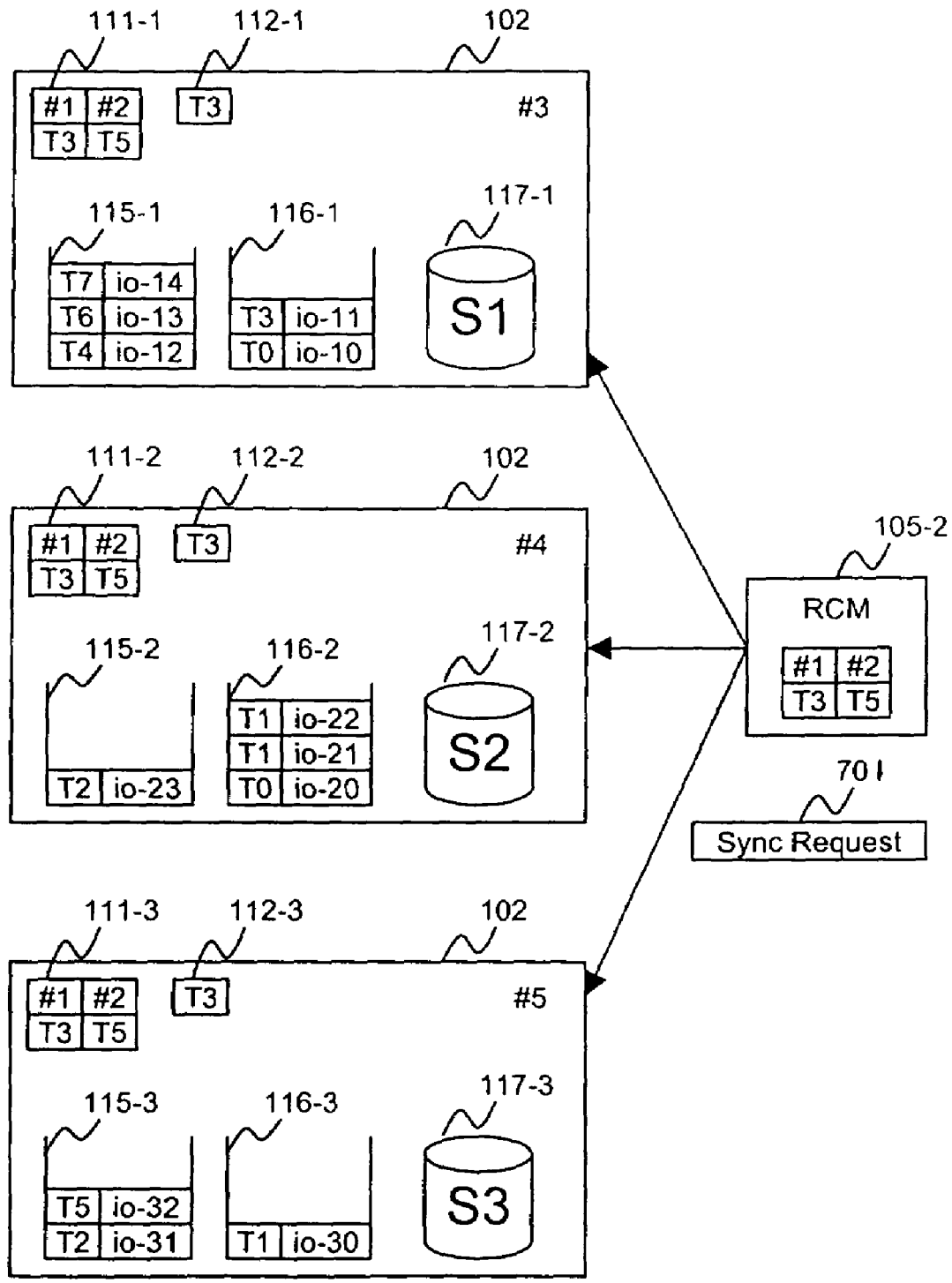

In connection with FIGS. 6A, 7A, 7B, and 7C, an embodiment of the synchronizing procedure will be described. When suspension occurs, RCM 105-2 collects the time indicated by the time parameters 111-1 #1 and #2, 111-2 #1 and #2, and 111-3 #1 and #2 (step 601 in FIG. 6A), and compares the corrected time so as to determine the synchronized time (step 602 in FIG. 6A). In FIG. 7A, the time parameters 111-1 #2, 111-2 #2 and 111-3 #2 all indicate the same timestamp value T5. In this case, T5 is determined to be the synchronized time for the primary storage subsystem 102 #2. For time parameters 111-1 #1, 111-2 #1 and 111-3 #1, T3 is the greatest value. In this case, T3 is determined to be the synchronized time for the secondary storage subsystem 102 #1. RCM 105-2 sends the secondary storage subsystem 102 #3-#5 a synchronization request 701 including the determined synchronized time T3 and T5 (step 603 in FIG. 6A). In response to the synchronize request 701, the time parameters 111-2 and 111-3 are synchronized as illustrated in FIG. 7B (step 604 in FIG. 6A). This change causes the time parameters 112-2 and 112-3 to be updated to T3. As illustrated FIG. 7C, when the time parameters 112-2 and 112-3 are updated to T3, io-23 (T2) and io-31 (T2) are moved to the disk request queues 116-2 and 116-3, respectively (step 605 in FIG. 6A).

At this stage, it is completed to move all the remote copy requests with timestamp less than or equal to T3 that the time parameters 112 indicate to queues 116. This means IO consistency up to time T3 is maintained among the secondary storage subsystems 102 #3-#5. Therefore, each secondary storage subsystem can send completion of the synchronize request 701 to the RCM 105-2 so as to allow the host computer 101-2 start to access the secondary storage subsystems 102 #3-#5 (step 605 in FIG. 6A).

Referring to FIGS. 6B, 7A, 7B and 7C, another embodiment of the synchronizing procedure will be described. The procedure depicted in FIG. 6B has the same steps 601-606 described in FIG. 6A and additionally steps 607 and 608, between step 605 and step 606.

Figure 7C:
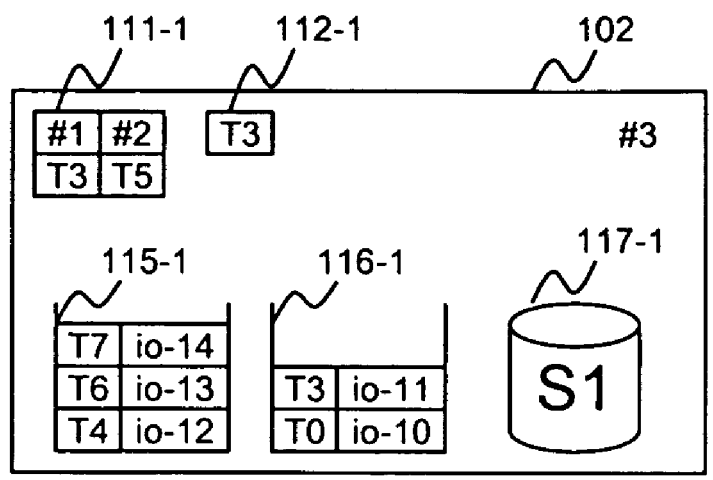
Figure 7C:
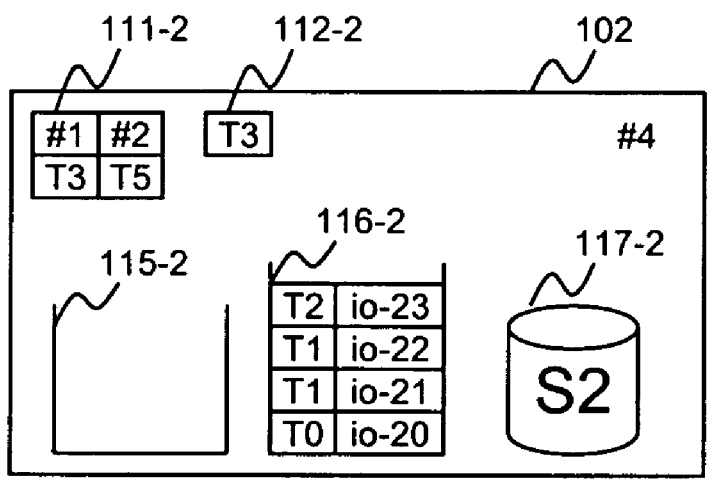
Figure 7C:
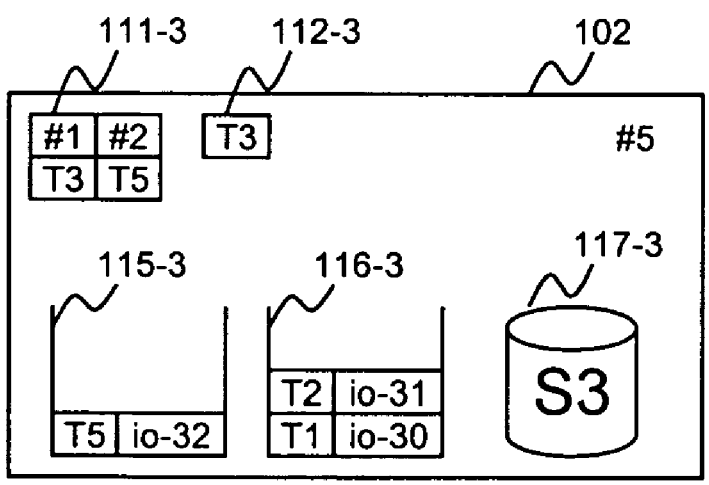
Figure 7D:
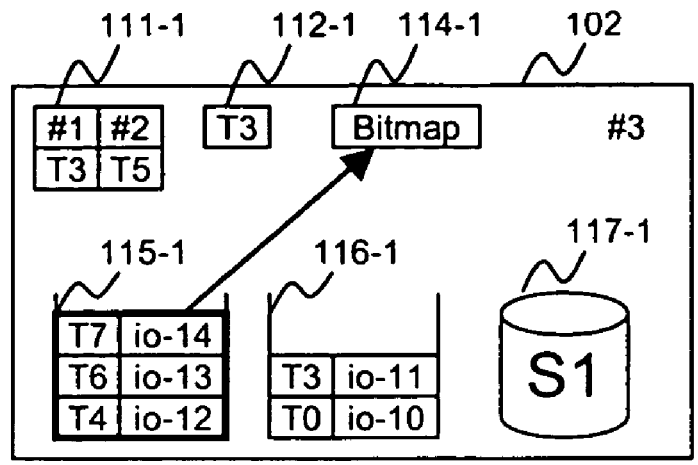
Figure 7D:
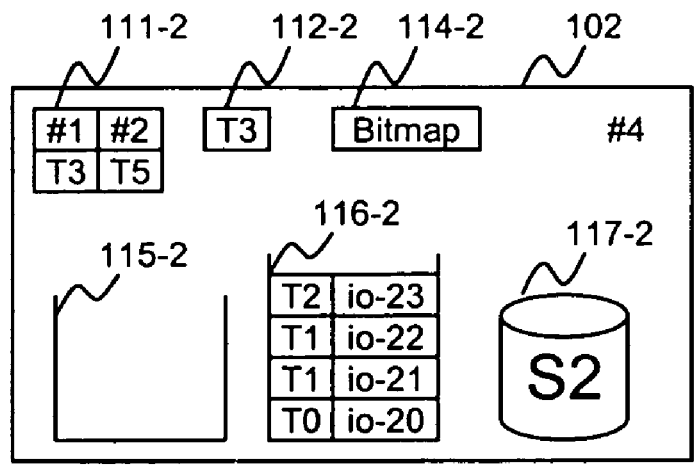
Figure 7D:
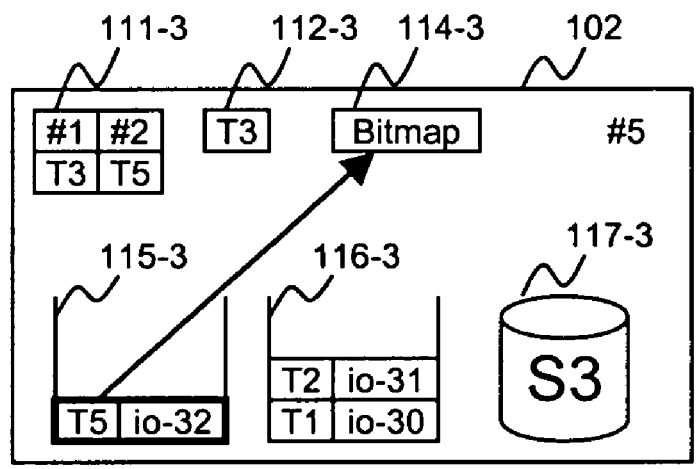

At the state illustrated in FIG. 7C, each of the secondary storage subsystems clears its remote copy request queue 115 after setting the bits which correspond to the locations (blocks, tracks, cylinders, etc) including addresses designated by the remaining remote copy requests in the queue 115 (step 607 in FIG. 6B). This step is automatically conducted after completion of the step 604 or conducted in response to a "clear remote copy" request issued by the RCM 105-2. FIG. 7D illustrates the clearing of queues 115-1 and 115-3.

Figure 7E:
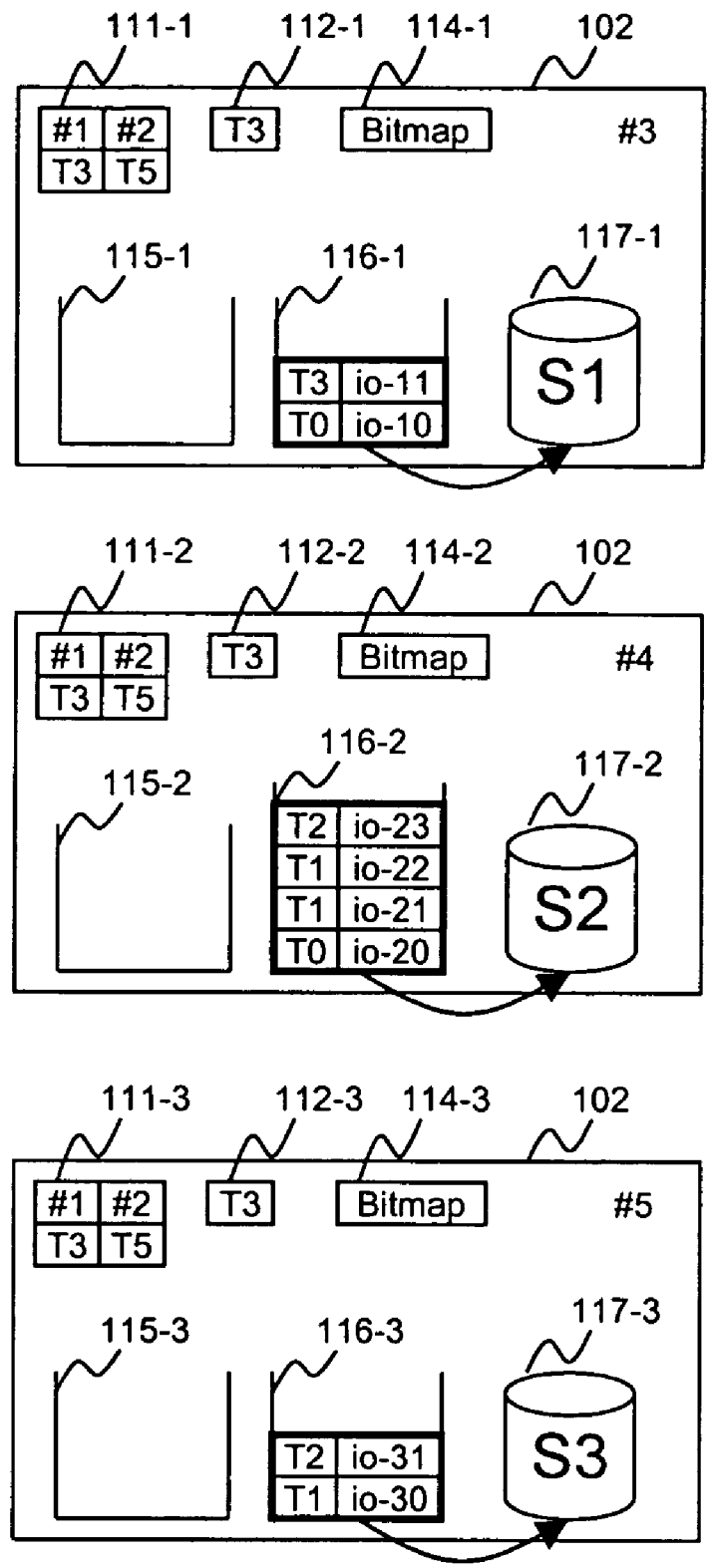
Figure 7F:
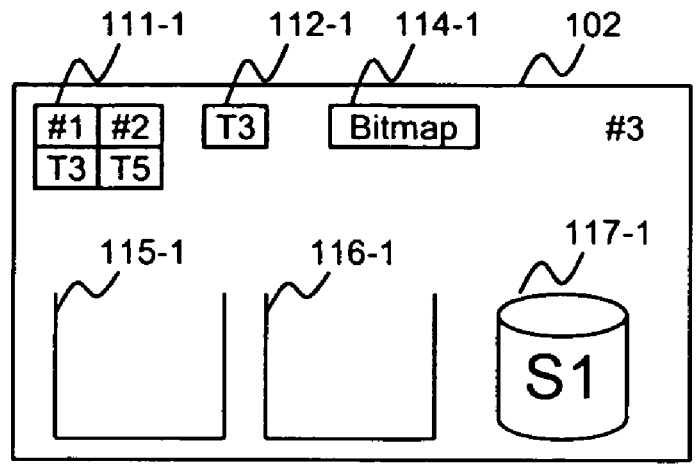
Figure 7F:
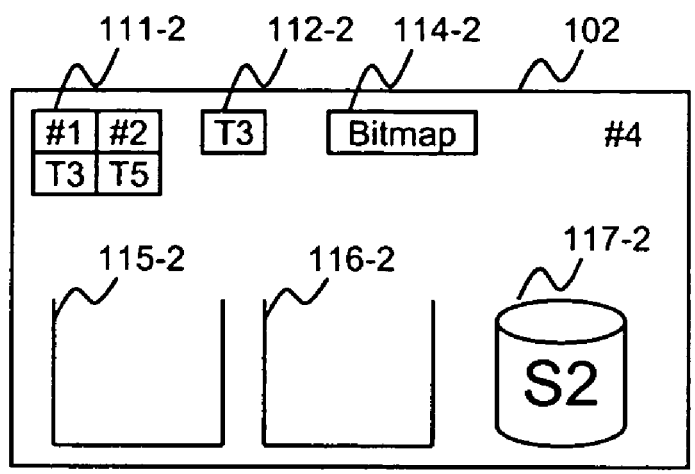
Figure 7F:
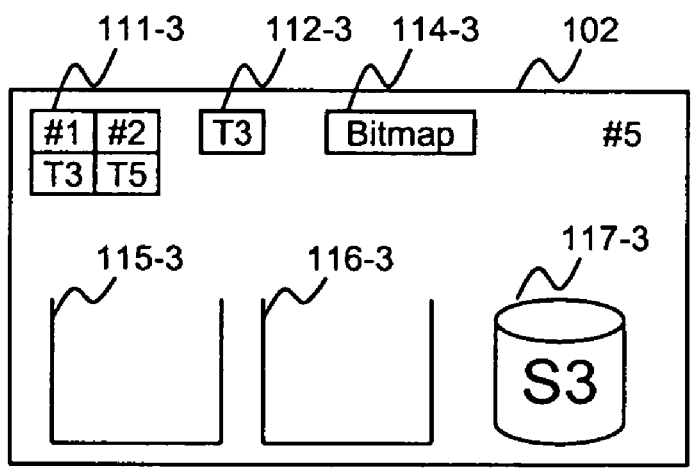

Subsequently, as illustrated in FIG. 7E, the secondary storage subsystems 102 #3-#5 perform queued remote copy requests in queues 116, or write the corresponding data into secondary volumes, and clear queues 116 (step 608 in FIG. 6B). FIG. 7F illustrates the state after the step 607 is completed.

After the step 608 is completed, each of the secondary storage subsystems 102 #3-#5 sends a completion message of the synchronize request 701 to RCN 105-2.

In the embodiment described FIG. 6A, the secondary storage subsystems 102 can perform the steps 606 and 607 as a background job after sending the completion message.

Figure 7G:
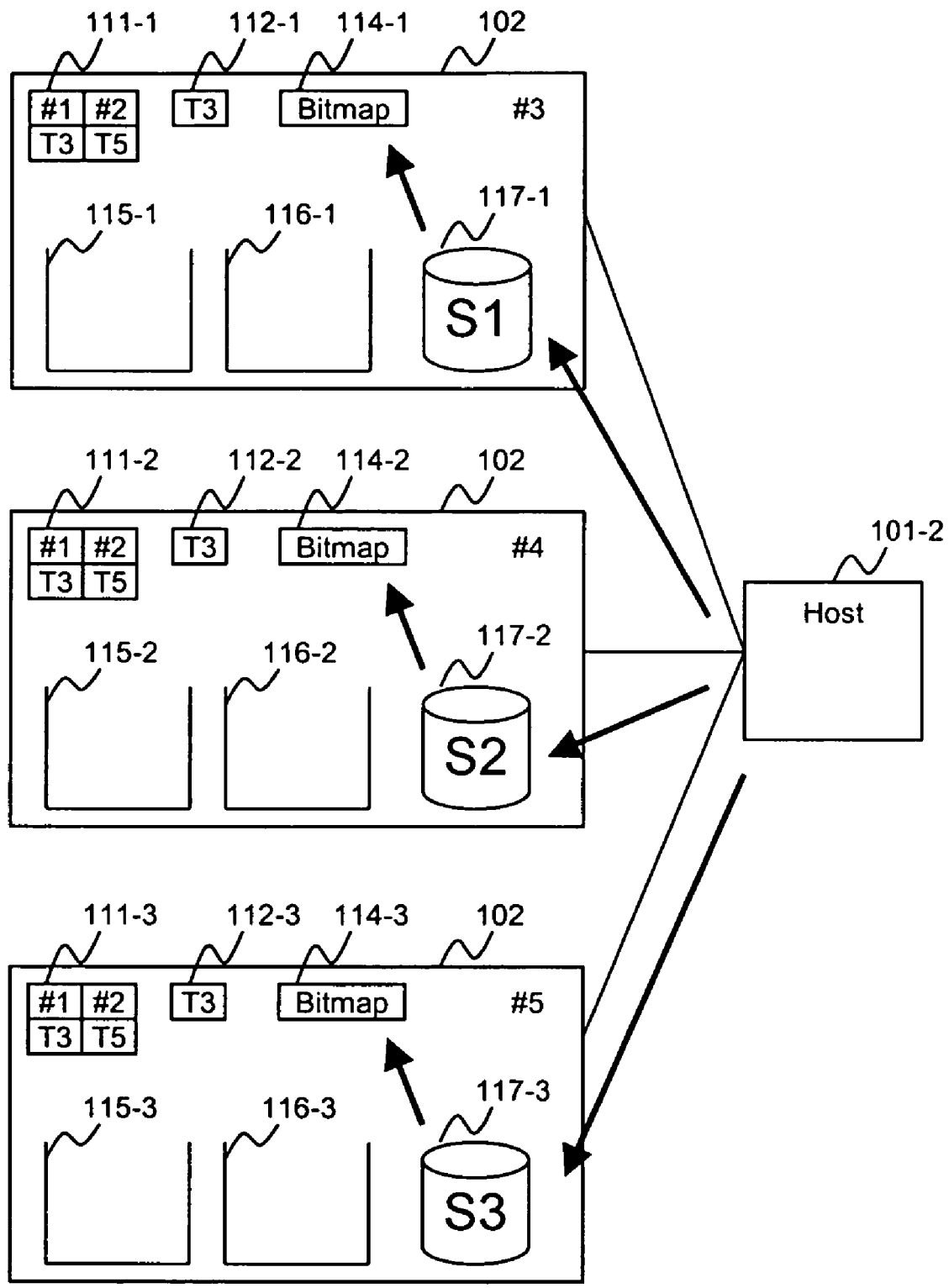

State g, illustrated in FIG. 7G, refers to host access at the secondary storage subsystems.

After the foregoing synchronizing procedure is performed, the host 101-2 starts access into the secondary storage subsystems 102. Update to a secondary volume reflects into the corresponding bitmap 114.

Figure 8:
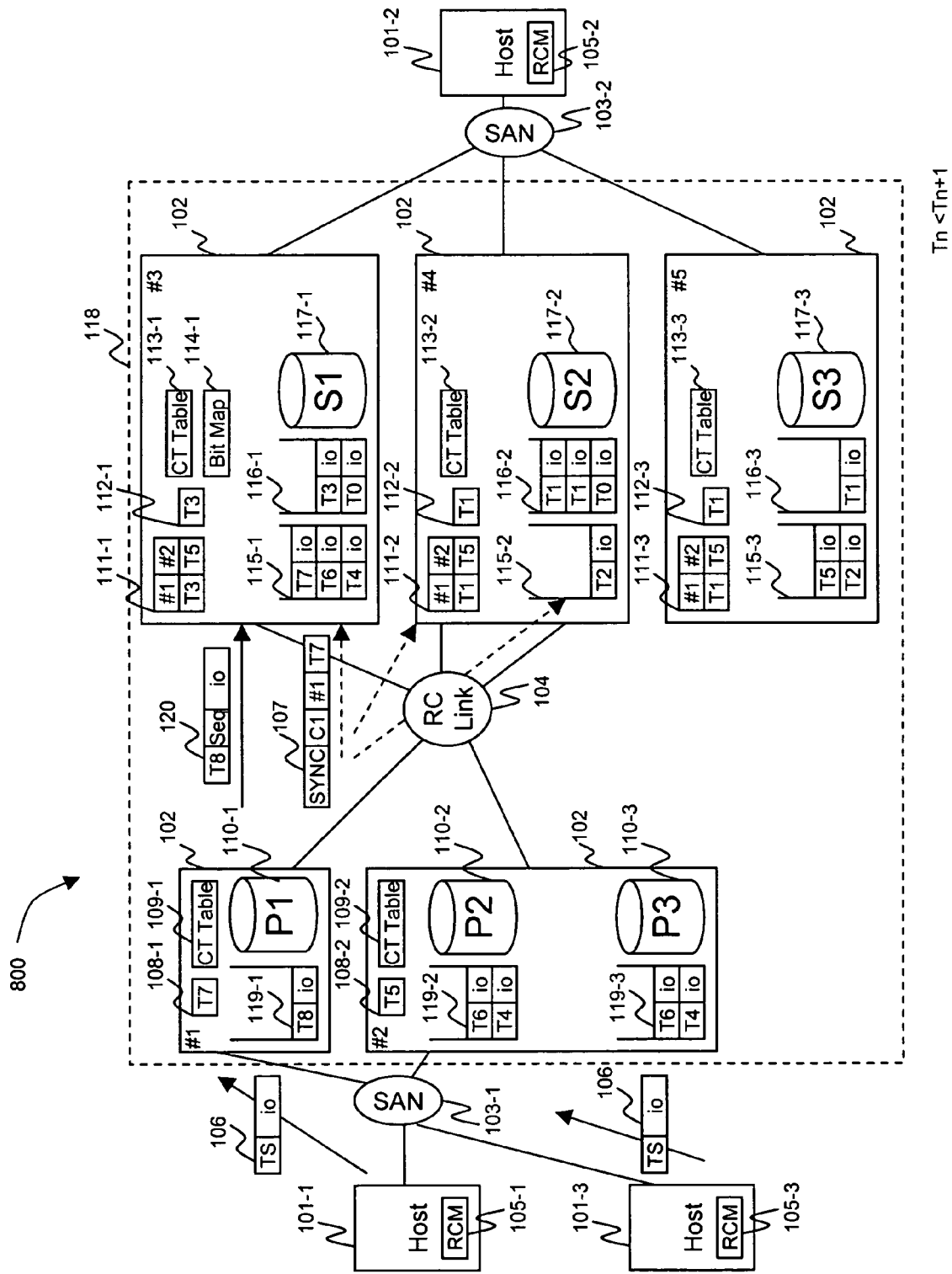
FIG. 8 illustrates another embodiment of system configuration of multiple storage subsystems, according to the present invention.

FIG. 8 illustrates another embodiment of a system configuration for multiple storage subsystems, according to the present invention.

In this system 800, multiple host computers 101-1 and 101-3 are connected to the primary storage subsystems 102 #1 and #2, while host computers have system timers like the IBM Sysplex Timer, and synchronize their times with each other. The other components are the same as the corresponding components described in FIG. 1. Also, the synchronizing procedures described in FIGS. 4-7G apply to system 800.

Figure 9:
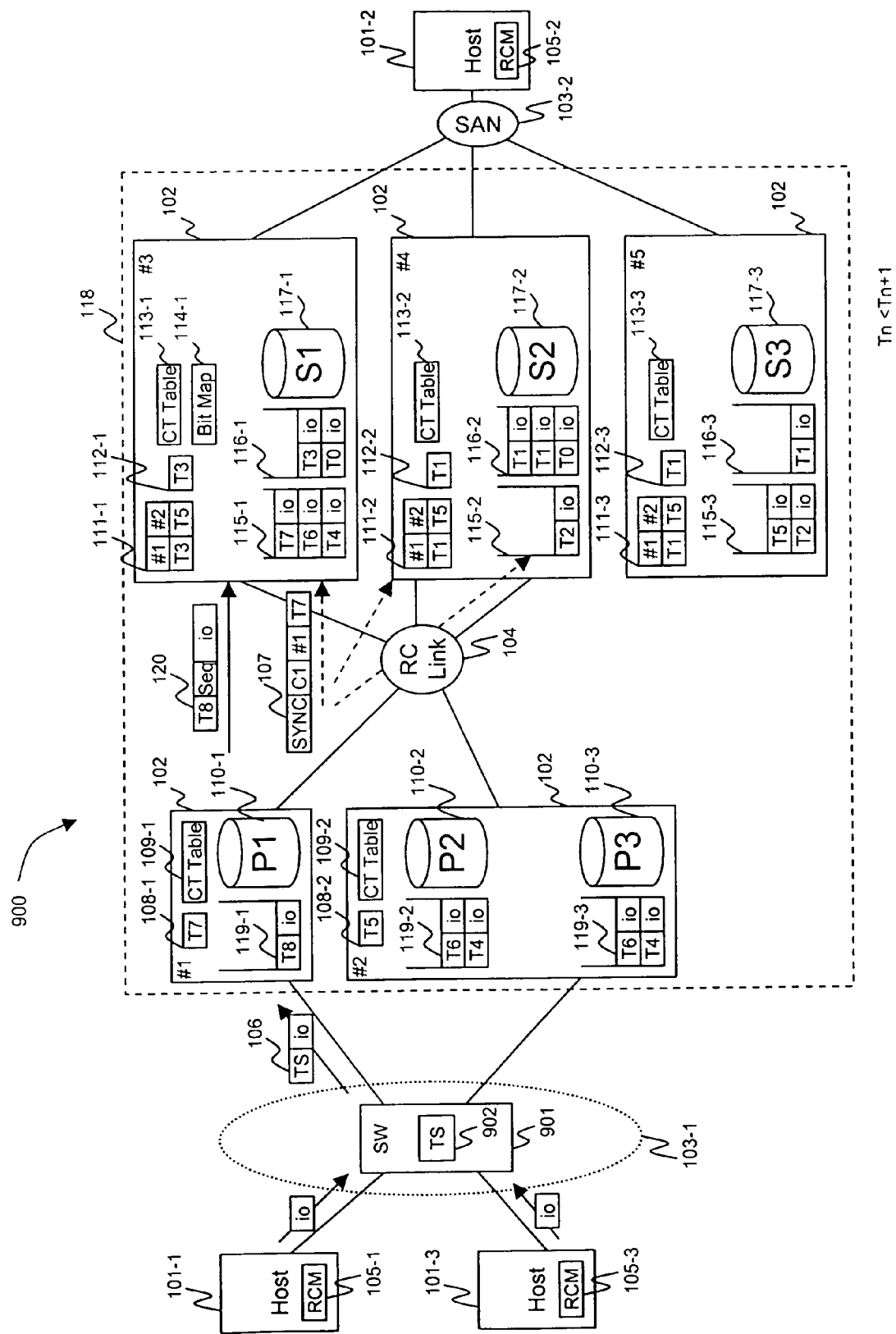
FIG. 9 illustrates another embodiment of system configuration of multiple storage subsystems, according to the present invention.

FIG. 9 illustrates another embodiment of a system configuration for multiple storage subsystems, according to the present invention.

In system 900, a fibre channel switch 901, a component of SAN 103-1, has a system timer 902 and provides a timestamp to each I/O received from host computers 101-1 and 101-2. The other components are the same as the corresponding components described in FIG. 1. Also, the synchronizing procedures described in FIGS. 4-7 apply to system 900. In this system, host computers do not need to synchronize their time with each other.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional blocks and relationship thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional blocks can be implemented by discrete components, application specific integrated circuits, processors executing appropriate software and the like or any combination thereof, as was described above in connection with FIGS. 12 and 13, for example. Thus, the breath and scope of the present invention should not be limited by any of the above described exemplary embodiments, but should be defined only in accordance with the following claims and their equivalents.

What is claimed is:

1. In a system including a plurality of primary storage subsystems, a plurality of secondary storage subsystems that are connected to each other via a network, and a host computer including a remote copy manager (RCM) and being connected with the secondary storage subsystems, a method for remotely copying data from each of a plurality of primary volumes directly via a remote copy link to a corresponding secondary volume of a plurality of secondary volumes, wherein a number of the plurality of primary storage subsystems is different from a number of the plurality of secondary storage subsystems, the primary volumes are constituted by the primary storage subsystems, and wherein the secondary volumes are constituted by the secondary storage subsystems, the method comprising:

(1) a normal synchronizing procedure including:
  receiving via the remote copy link, at each of the secondary storage subsystems, remote copy requests each of which is associated with a timestamp and directly sent from each one of the plurality of primary storage subsystems;
  receiving via the remote copy link, at each of the secondary storage subsystems, synchronizing requests each of which is associated with a timestamp and a primary storage ID of a primary storage subsystem, which sends a respective synchronizing request, from said each one of the primary storage subsystems respectively;
  determining, at each of the secondary storage subsystems, a first time as a first time parameter based on timestamps included in the synchronizing requests; and
  determining, at each of the secondary storage subsystems, which remote copy requests to process based on the first time parameter, primary storage IDs and timestamps associated with the remote copy requests, thereby maintaining data I/O consistency among said storage subsystems; and (2) an after-failure synchronizing procedure including:
  suspending said remote copy requests from being directly sent from the primary storage subsystems via the remote copy link to the secondary storage subsystems after a failure occurs, thereby starting a suspension period;
  collecting via a network link and comparing during the suspension period by the RCM in the host computer time parameters stored in the secondary storage systems to determine a synchronized time, said network link being different from the remote copy link and not overlapping with the remote copy link;
  receiving via said network link during the suspension period from the RCM in said host computer at each of the secondary storage subsystems synchronizing requests each of which includes said synchronized time;

updating during the suspension period second time parameters at each of the secondary storage subsystems up to said synchronized time; and determining during the suspension period, at each of the secondary storage subsystems, which remote copy requests to process based on said updated second time parameter and processing a determined remote copy request by said each secondary storage subsystem therein, thereby maintaining data I/O consistency among said storage subsystems.

2. The method of claim 1, wherein the normal synchronizing procedure further includes:

performing, at each of the secondary storage subsystems, write processing in accordance with remote copy requests that are associated with timestamps indicating an earlier time than the first time.

3. The method of claim 1, wherein the normal synchronizing procedure further includes:

managing, at each of the secondary storage subsystems, a second time parameter for each of the primary storage subsystems; and updating corresponding second time parameters at each of the secondary storage subsystems in response to whether timestamps associated with the synchronizing requests indicate a later time than the corresponding second time parameters of the second storage subsystems.

4. The method of claim 3, wherein the first time is the earliest time indicated by the second time parameters.

5. The method of claim 1, wherein the determining step in the after-failure synchronizing procedure involves updating a secondary volume corresponding to the determined remote copy request.

6. The method of claim 1, wherein the determining step in the after-failure synchronizing procedure involves selecting remote copy requests which are received by the secondary storage subsystems prior to the suspension and have a first time parameter smaller than or equal to said synchronized time to be processed so as to update a corresponding secondary volume.

7. The method of claim 6, wherein remote copy requests which are received by the secondary storage subsystems prior to the suspension and have a first time parameter bigger than said synchronized time are used to update a bitmap of a corresponding secondary storage subsystem.

8. The method of claim 1, where time parameters stored in the secondary storage systems are allocated at a fibre channel switch in the network, rather than at the host computer.

9. A software residing in a computer readable storage medium that remotely copies data from each of a plurality of primary volumes directly via a remote copy link to a corresponding secondary volume of a plurality of secondary volumes implemented in a data storage system that includes a plurality of primary storage subsystems, a plurality of secondary storage subsystems that are connected to each other via a network, and a host computer including a remote copy manager (RCM) and being connected with the secondary storage subsystems, wherein a number of the plurality of primary storage subsystems is different from a number of the plurality of secondary storage subsystems, the primary volumes are constituted by the primary storage subsystems, and wherein the secondary volumes are constituted by the secondary storage subsystems, the software comprising:

(1) a normal synchronizing module including:

a module receiving via the remote copy link, at each of the secondary storage subsystems, remote copy requests which are each associated with a timestamp and directly sent from each one of the plurality of primary storage subsystems respectively;

a module receiving via the remote copy link, at each of the secondary storage subsystems, synchronizing requests each of which is associated with a timestamp and a primary storage ID of a primary storage subsystem, which sends a respective synchronizing request, from said each one of the primary storage subsystems respectively;

a module determining, at each of the secondary storage subsystems, a first timer as a first time parameter based on the timestamps included in the synchronizing requests; and a module determining, at each of the secondary storage subsystems, which remote copy requests to process based on the first time parameter, primary storage IDs and timestamps associated with the remote copy requests, thereby maintain data I/O consistency among said storage subsystems; and (2) an after-failure synchronizing module including:

a module suspending said remote copy requests from being directly sent from the primary storage subsystems via the remote copy link to the secondary storage subsystems after a failure occurs, thereby staffing a suspension period;

a module collecting via a network link and comparing during the suspension period by the RCM in the host computer time parameters stored in the secondary storage systems to determine a synchronized time, said network link being different from the remote copy link and not overlapping with the remote copy link;

a module receiving via said network link during the suspension period from the RCM in said host computer at each of the secondary storage subsystems synchronizing requests each of which includes said synchronized time;

a module updating during the suspension period second time parameters at each of the secondary storage subsystems up to said synchronized time;

and a module determining during the suspension period, at each of the secondary storage subsystems, which remote copy requests to process based on said updated second time parameter and processing a determined remote copy request by said each secondary storage subsystem therein, thereby maintaining data I/O consistency among said storage subsystems.

10. The software of claim 9, wherein the normal synchronizing module further includes:

a module write processing, at each of the secondary storage subsystems, in accordance with remote copy requests that are associated with timestamps indicating a earlier time than the first time.

11. The software of claim 9, wherein the normal synchronizing module further includes:

a module managing, at each of the secondary storage subsystems, a second time parameter for each of the primary storage subsystems, and updating the corresponding second time parameters in response to timestamps associated with the synchronizing requests that indicate a later time than corresponding second time parameters of the second storage subsystems.

12. The software of claim 11, wherein the first time is the earliest time indicated by the second time parameters.

13. The software of claim 9, wherein the module determining in the after-failure synchronizing module includes a module updating a secondary volume corresponding to the determined remote copy request.

14. The software of claim 9, wherein said module determining in the after-failure synchronizing module includes a module selecting remote copy requests which are received by the secondary storage subsystems prior to the suspension and have a first time parameter smaller than or equal to said synchronized time to be processed so as to update a corresponding secondary volume.

15. The software of claim 14, wherein remote copy requests which are received by the secondary storage subsystems prior to the suspension and have a first time parameter bigger than said synchronized time are used to update a bitmap of a corresponding secondary storage subsystem.

16. In a system for remotely copying data from each of a plurality of primary volumes directly via a remote copy link to a corresponding secondary volume of a plurality of secondary volumes implemented in a data storage system that includes a plurality of host computers each including a remote copy manager (RCM), a plurality of primary storage subsystems and a plurality of secondary storage subsystems, all connected to each other via a network, wherein a number of the plurality of primary storage subsystems is different from a number of the plurality of secondary storage subsystems, the primary volumes are constituted by the primary storage subsystems, and wherein the secondary volumes are constituted by the secondary storage subsystems, each of the host computers implementing said system that comprises:

(1) normal synchronizing means including:

means for receiving via the remote copy link, at each of the secondary storage subsystems, remote copy requests which are each associated with a timestamp and directly sent from each one of the plurality of primary storage subsystems;

means for receiving via the remote copy link, at each of the secondary storage subsystems, synchronizing requests each of which is associated with a timestamp and a primary storage ID of a primary storage subsystem, which sends a respective synchronizing request, from said each one of the primary storage subsystems respectively;

means for determining, at each of the secondary storage subsystems, a first timer as a first time parameter based on the timestamps included in the synchronizing requests; and means for determining, at each of the secondary storage subsystems, which remote copy requests to process based on the first time parameter, primary storage IDs and timestamps associated with the remote copy requests, thereby maintain data I/O consistency among said storage subsystems; and (2) after-failure synchronizing means including:

means for suspending said remote copy requests from being directly sent from the primary storage subsystems via the remote copy link to the secondary storage subsystems after a failure occurs, thereby starting a suspension period;

means for collecting via a network link and comparing during the suspension period the RCM in by the host computer time parameters stored in the secondary storage systems to determine a synchronized time, said network link being different from the remote copy link and not overlapping with the remote copy link;

means for receiving via said network link during the suspension period from the RCM in said host computer at each of the secondary storage subsystems synchronizing requests each of which includes said synchronized time;

means for updating during the suspension period second time parameters at each of the secondary storage subsystems up to said synchronized time; and means for determining during the suspension period, at each of the secondary storage subsystems, which remote copy requests to process based on said updated second time parameter and processing a determined remote copy request by said each secondary storage subsystem therein, thereby maintaining data I/O consistency among said storage subsystems.

17. In a system according to claim 16, wherein the normal synchronizing means further includes:

means for write processing, at each of the secondary storage subsystems, in accordance with remote copy requests that are associated with timestamps indicating an earlier time than the first time.

18. In a system according to claim 16, wherein the normal synchronizing means further includes:

means for managing, at each of the secondary storage subsystems, a second time parameter for each of the primary storage subsystems, and for updating the corresponding second time parameters in response to timestamps associated with the synchronizing requests that indicate a later time than corresponding second time parameters of the second storage subsystems.

19. In a system according to claim 18, wherein the first time is the earliest time indicated by the second time parameters.

20. In a system according to claim 16, wherein means for determining in the after-failure synchronizing means includes means for updating a secondary volume corresponding to the determined remote copy request.

21. In a system according to claim 16, wherein said means for determining in the after-failure synchronizing means includes means for selecting remote copy requests which are received by the secondary storage subsystems prior to the suspension and have a first time parameter smaller than or equal to said synchronized time to be processed so as to update a corresponding secondary volume.

22. In a system according to claim 21, wherein remote copy requests which are received by the secondary storage subsystems prior to the suspension and have a first time parameter bigger than said synchronized time are used to update a bitmap of a corresponding secondary storage subsystem.

* * * * *